April 20, 1926.
V. IZQUIERDO
1,581,449
BRAKING DEVICE FOR FRONT WHEELS OF MOTOR CARS
Filed May 29, 1924
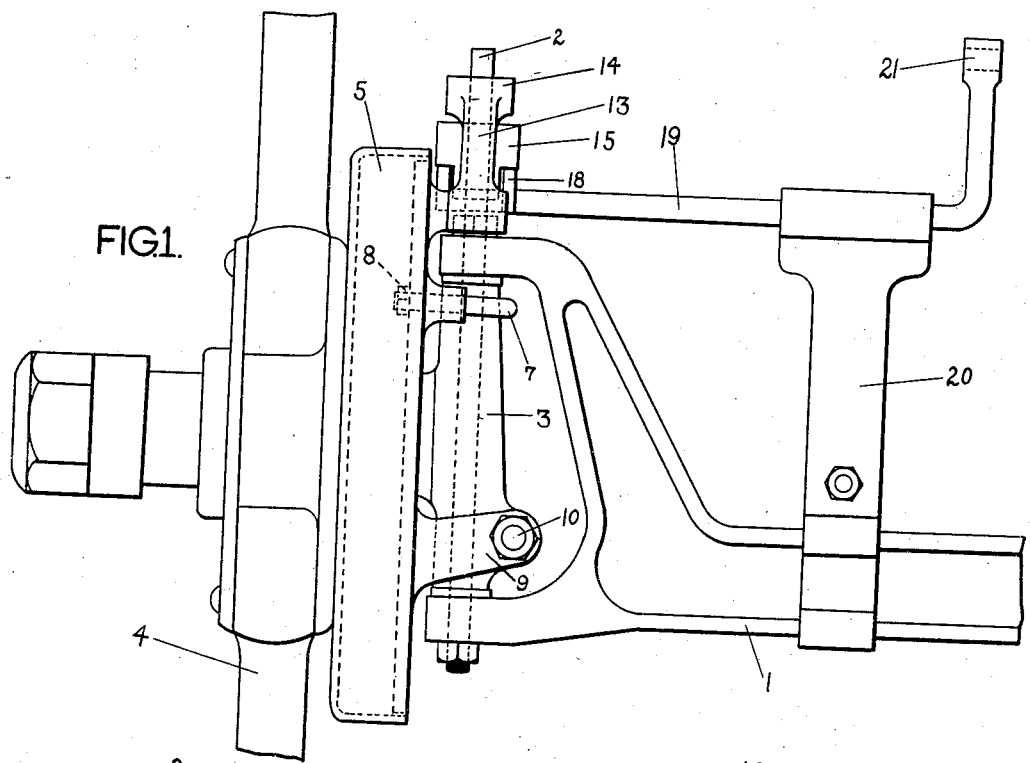
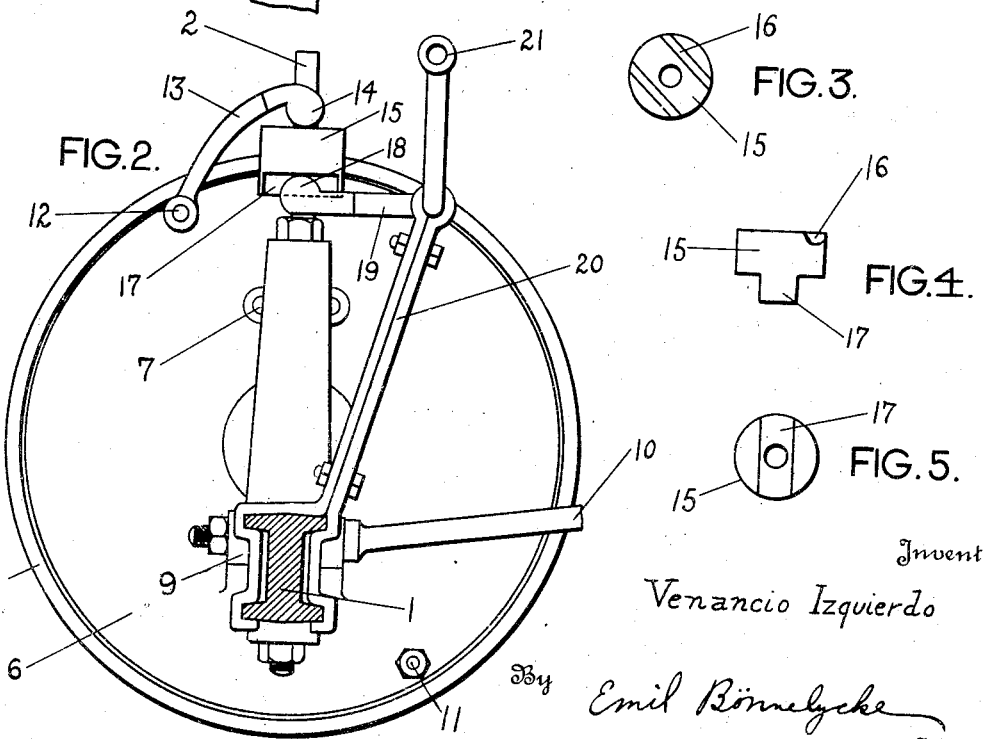 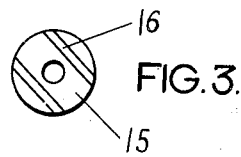 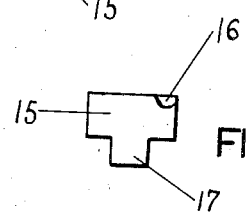 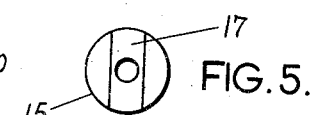
Inventor
Venancio Izquierdo
By Emil Bönnelycke
Attorney Patented Apr. 20, 1926.

1,581,449

UNITED STATES PATENT OFFICE.

VENANCIO IZQUIERDO, OF BUENOS AIRES, ARGENTINA.

BRAKING DEVICE FOR FRONT WHEELS OF MOTOR CARS.

Application filed May 29, 1924. Serial No. 716,763.

*To all whom it may concern:*

Be it known that I, VENANCIO IZQUIERDO, a subject of the King of Spain, residing at 343 Brué Neitre Street, Buenos Aires, Argentina, have invented certain new and useful Improvements in Braking Devices for Front Wheels of Motor Cars, of which the following is a specification.

My present invention relates to certain improvements in motor cars and particularly to braking devices for the front wheels thereof its object being to provide a new system for the front wheels which may be used in connection with different makes of cars.

In order that my present invention may be clearly understood and easily carried into practice, a preferred embodiment thereof has been shown in the appended drawings, wherein,—

Fig. 1 is a front view of my improved device as fixed to the front wheel of an automobile.

Fig. 2 is a side view thereof in which only the brake drum and accessories according to my present invention have been illustrated.

Figs. 3, 4 and 5 show details of the intermediate disc as hereafter explained.

Similar characters of reference denote same or like parts throughout the said figures.

Although my present invention is shown and described in connection with a car of the Ford type it is obvious that it may also be applied to any other type of car with suitable modifications.

In the embodiment shown, 1 is the front axle of the car having fixed thereon the bearings through which the bolt 2 passes, said bolt being longer than usual and extends beyond the upper part of the bearing. On the said bolt there is the usual bushing 3 in one piece with the axle point on which the wheel 4 is rotatably mounted. A brake drum 5 is concentrically secured to the said wheel, the brake being operated as hereafter explained. 6 is the brake plate of the said drum fixed to the bushing 3 by means of the securing brace 7 and end nuts 8 and also by the arms 9 suitably fixed at 10 on the steering arm so that said plate shall be fixed and thus will take up the torque of the brake bands when the brake is operated. 11 is the anchor of said brake bands and 13 is a lever fixed to the axle 12 on which the operating cam (not shown) or any equivalent device is fixed.

The lever 13 terminates at its free end in a forked member 14 which rests on a centrally perforated disc 15. This disc 15 is free to slide vertically on the bolt 2 as shown. Said disc has in its upper face a diametrical slot 16 and on its lower face a guide-way 17 under which the forked end 18 of a double bent actuating lever 19 acts, said lever being rotatably supported by an arm 20 or other suitable support. The free end 21 of said lever is suitably connected to any brake acting means.

In the embodiment shown it is obvious that when action is exerted on the end 21 of the lever 19 in a suitable direction, the forked end thereof will be raised carrying therewith the disc 15 which will press under the forked end 14 of the lever 13. The lever will be turned to a suitable angle and the brake be applied in a corresponding degree; and the lever 19 being free, the parts will return to their normal positions by any suitable means or by the usual springs which tends to force the free ends of the brake shoes inwardly.

However and with the purpose of obviating the perils originated by the braking of the outer front wheel when rounding a corner, the slots 16 are formed on the discs 15, said slots being respectively oppositely inclined with respect of the axle of the vehicle at each wheel, so that when the wheels are inclined and the brake is applied, the forked end 14 of the lever 13 corresponding to the outer front wheel of the curve, will fall within said slot and the corresponding brake will not be applied. If desired one slot 16 in the disc 15 may be used in which case the forked lever 13 will have only one fork 14. The forks 14 are forced out of the slots by means of the angular sides of the slots as shown in Fig. 4 but of course other suitable means may be employed to accomplish this end.

It is obvious that many constructional and other changes may be introduced without departing from the scope of my present invention which has been clearly set forth in the appended claiming clauses.

Having now fully described and ascertained the nature of my present invention and in what manner the same is to be carried into practice I declare that what I claim, and desire to protect by Letters Patent is:—

1. Steering wheel braking mechanism for motor cars comprising a brake plate for each wheel; a bolt secured to the axle of each wheel; a disc mounted on said bolt; and means mounted on said brake plate for actuating solely the brake of the inside wheel upon actuation of said discs when the car is rounding a curve.

2. Steering wheel braking mechanism for motor cars comprising a brake plate for each wheel; a bolt secured to the axle of each wheel; a disc mounted on said bolt; means for actuating said disc; and means cooperating with said disc and mounted on said brake plate for actuating solely the brake of the inside wheel upon actuation of said discs when the car is rounding a curve.

3. Steering wheel braking mechanism for motor cars comprising a brake plate for each wheel; a lever mounted on each brake plate and adapted to operate the brake shoes; a bolt secured to the axle of each wheel; a disc slidably mounted on said bolt and adapted to cooperate with said lever, said disc having a groove therein; and means for actuating solely the brake of the inside wheel upon actuation of the brakes when the car is rounding a curve.

4. Steering wheel braking mechanism for motor cars comprising a brake plate for each wheel; a lever mounted on each brake plate and adapted to operate the brake shoes, said lever being forked at its free end; a bolt secured to the axle of each wheel; a disc slidably mounted on each bolt and having a groove therein; and means for actuating said discs whereby upon actuation of the brakes the forks of the lever will cooperate with the groove of its disc to prevent application of the brake of the outside wheel when the car is rounding a curve.

5. Steering wheel braking mechanism for motor cars comprising a brake plate for each wheel; a lever mounted on each brake plate and adapted to operate the brake shoes, said lever being forked at its free end; a bolt secured to the axle of each wheel; a disc slidably mounted on each bolt and having a groove therein; and a double bent lever for each brake plate for actuating said discs whereby upon actuation of the brakes the forks of the first-named lever will cooperate with the groove of its disc to prevent application of the brake of the outside wheel when the car is rounding a curve.

6. In a motor car, the combination with a pair of steering wheels, of a brake mechanism comprising a brake device for each wheel; a brake lever mounted on a plate of each brake device; a disc for each lever; and means for operating said discs whereby solely the brake of the inside wheel is actuated upon actuation of the brake mechanism when the car is rounding a curve.

7. In a motor car, the combination with a pair of steering wheels, of a brake mechanism comprising a brake device for each wheel; a bolt secured to the axle of each wheel; and brake operating means including a disc mounted on said bolt for actuating solely the brake of the inside wheel upon actuation of the brake operating means when the car is rounding a curve.

8. In a motor car, the combination with a pair of steering wheels, of a brake mechanism comprising a brake device for each wheel; a lever for each brake device mounted at one end to a plate of said brake device and having a pair of forks on the other end; a bolt secured to the axle of each wheel; a disk mounted on each bolt and having a groove therein; and operating means for operating said discs whereby upon actuation of the brake mechanism the forks of the lever will cooperate with the groove of its disc to prevent application of the brake of the outside wheel when the car is rounding a curve.

9. In a motor car, the combination with a pair of steering wheels of a brake mechanism comprising a brake device for each wheel; a lever for each brake device mounted at one end to a plate of said brake device; a bolt secured to the axle of each wheel; a disc mounted on each bolt and adapted to cooperate with the free end of said lever; and operating means for operating said discs whereby upon actuation of the brake mechanism the lever will cooperate with its disc to prevent application of the brake of the outside wheel when the car is rounding a curve.

10. In a motor car, the combination with a pair of steering wheels of a brake mechanism comprising a brake device for each wheel; a lever for each brake device mounted at one end to a plate of said brake device; a disc slidably mounted to the axle of each wheel and adapted to cooperate with the free end of said lever; and operating means for operating said discs whereby upon actuation of the brake mechanism the lever will cooperate with its disc to prevent application of the brake of the outside wheel when the car is rounding a curve.

In testimony whereof I affix my signature.

VENANCIO IZQUIERDO.